United States Patent
Khosla

[19]

[11] Patent Number: 6,080,063
[45] Date of Patent: Jun. 27, 2000

[54] SIMULATED REAL TIME GAME PLAY WITH LIVE EVENT

[76] Inventor: Vinod Khosla, 630 Los Trancos Rd., Portola Valley, Calif. 94025

[21] Appl. No.: 08/779,179

[22] Filed: Jan. 6, 1997

[51] Int. Cl.⁷ .................................................. A63F 9/24
[52] U.S. Cl. .............................................................. 463/42
[58] Field of Search .............................. 463/30–33, 40, 463/41, 42, 6; 364/410.1, 578

[56]       References Cited

U.S. PATENT DOCUMENTS

| | | |
|---|---|---|
| 4,305,131 | 12/1981 | Best . |
| 4,339,798 | 7/1982 | Hedges et al. . |
| 4,467,424 | 8/1984 | Hedges et al. . |
| 4,569,529 | 2/1986 | Gibbs . |
| 4,662,635 | 5/1987 | Enokian . |
| 4,781,377 | 11/1988 | McVean et al. . |
| 5,083,800 | 1/1992 | Lockton ..................................... 463/42 |
| 5,343,239 | 8/1994 | Lappington et al. . |
| 5,377,973 | 1/1995 | Jones et al. . |
| 5,423,554 | 6/1995 | Davis ........................................ 463/31 |
| 5,462,275 | 10/1995 | Lowe et al. ............................... 463/31 |
| 5,476,259 | 12/1995 | Weingardt . |
| 5,490,247 | 2/1996 | Tung et al. . |
| 5,495,576 | 2/1996 | Ritchey . |
| 5,508,731 | 4/1996 | Kohorn . |
| 5,526,035 | 6/1996 | Lappington et al. . |
| 5,526,479 | 6/1996 | Barstow et al. ......................... 345/473 |
| 5,539,822 | 7/1996 | Lett . |
| 5,553,864 | 9/1996 | Sitrick ....................................... 463/31 |
| 5,595,389 | 1/1997 | Parulski et al. ........................... 463/31 |
| 5,613,909 | 3/1997 | Stelovsky ................................. 463/30 |
| 5,815,411 | 9/1998 | Ellenby et al. ......................... 364/559 |
| 5,850,352 | 12/1998 | Moezzi et al. ...................... 364/514 A |
| 5,860,862 | 1/1999 | Junkin ..................................... 463/40 |

FOREIGN PATENT DOCUMENTS 93830409  12/1995  European Pat. Off. .

*Primary Examiner*—Mark A. Sager
*Attorney, Agent, or Firm*—Mark A. Haynes; Haynes & Beffel LLP

[57]       ABSTRACT

A game play system allows remote players to participate in a concurrent simulation of a live event as the live event is occurring. The system gathers input from sensors located at the live event, preprocesses this input, and transfers it to a computer system, which uses this input to create a concurrent simulation of the live event. A remote game player can then interact with the concurrent simulation by providing input to the concurrent simulation through a user interface. This system combines the excitement of a highly interactive video game with the drama and publicity surrounding a live event. The live event can thereby set the standard of performance for the concurrent simulation. Remote game players may additionally compete against each other to determine an overall global winner amongst the remote game players in the live event.

47 Claims, 6 Drawing Sheets

6,080,063

SIMULATED REAL TIME GAME PLAY WITH LIVE EVENT

BACKGROUND

1. Field of Invention

The present invention relates to video games, computer simulations, computer networks, broadcast networks, and synchronization of distributed computing systems. In particular, the present invention relates to providing a computer-based system which allows computer users to participate in a simulation of a live event at the same time the live event is taking place.

2. Related Art

Video games are a popular form of entertainment finding widespread use in a variety of forms, including: standalone video game systems, game cartridge systems connected to television sets, and video game software for personal computers. Thousands of video game titles are presently available, allowing video game players to participate in simulated activities as diverse as automobile racing, gambling, skiing, motorcycle racing, karate, and even aerial combat. These simulated games typically allow a video game player to control the actions of a simulated participant on a video game screen by manipulating various knobs, buttons, joysticks, trackballs, and keyboards.

Video game players typically interact with and compete against simulated opponents on a simulated course, thereby setting an artificial standard of performance, which may be quite different from the standard of performance required to complete in a real live competitive event. Rather than competing against each other directly, video game players typically compete against simulated opponents, and then later compare scores against these simulated opponents with other video game players.

Some video games can be played across multiple computers which are connected together by a computer network—even geographically distributed computer systems linked by cross-country computer networks. These systems allow multiple players sitting at individual computers to participate in, and compete in, the same simulated video game. Players are able to compete against each other as well as simulated opponents, thereby adding a new dimension to the competition. Although these systems allow video game players to directly compete against each other, they provide no indication as to how performance in a multi-participant simulated game would translate into performance in a real live competitive event.

Interactive television systems allow television viewers to participate in live broadcast events in a limited way, by providing a limited bandwidth bidirectional communication channel between the TV broadcast center and a hand held unit attached to a television set. Users can enter limited types of predictive or voting information into these handheld units. This information is transferred back to the TV broadcast center where it is tabulated to determine polling results or contest winners. For example, see U.S. Pat. No. 5,526,035, "Transaction Based Interactive Television System," by Lappington, et al. However, these interactive television systems typically have limited means for data input and lack the processing power to support an interactive simulation of a live event.

Some gambling systems allow wagering and betting on live gambling events from remote locations. In these systems, live gambling events such as casino games or horse races, are broadcast to remote locations, where remote participants can place wagers on the outcome of the gambling events. Implementing remote gambling systems of this type requires almost no interaction is required between the remote participant and the live gambling event. The remote participant merely bets on the outcome of the gambling event, and does not try to "interact" with the gambling event as it is played. See for example, U.S. Pat. No. 4,339,798, "Remote Gaming System," by Hedges, et al. In contrast, interactive games such as automobile racing require more intensive interactive participation by game players.

Telepresence systems allow users to navigate through and selectively view a target location from a remote location. A telepresence system gathers input from sensors, such as video cameras and microphones, located at a target location and transfers this input to the remote location. A user at the remote location can then guide the video camera and other sensors located at the target location by manipulating a set of controls at the remote location. In this way, a remote user can navigate through and selectively view a target location from a remote location. For example, see U.S. Pat. No. 5,495,576, "Panoramic Image Based Virtual Reality/Telepresence Audio-Visual System and Method," by Ritchey. Although telepresence systems allow a remote user to view a target location, they do not facilitate simulated participation in a live event taking place at the target location.

SUMMARY

The present invention provides a method and apparatus for simulating participation in a live event. It operates by gathering input from the live event through sensors located at the live event, and by gathering user input from a remote participant through a user interface. These inputs are transmitted to a computer system where they are used to generate a display of the simulation, which reflects what is actually happening at the live event, as well as the effect of user commands on the live event simulation. The display includes "entities" corresponding to real participants in the live event as well as "entities" corresponding to simulated participants in the live event.

For example, the live event may be an automobile race. Sensors at the race periodically record the position of real automobiles participating in the race. This position information is relayed to the computer system where it is used to construct a display of the automobile race showing the real vehicles in their proper locations. Commands received from the user interface control a simulated vehicle in the display. By issuing commands through the user interface, a remote participant navigates the simulated vehicle in and out of the real vehicles in the display. In this way, the excitement a highly interactive video game is combined with the drama and publicity surrounding a live event.

The present invention allows remote participants to effectively "compete" with the real participants in the live event. The live event can thereby set the standard of performance for simulated participants in the live event. This differs significantly from a conventional video game in which the standard of performance is entirely artificial.

A global winner can be determined by gathering simulation results from a large number of geographically distributed players through a return communication channel. In this way, potentially millions of remote participants can compete in a single simulation of a live event for the highest overall score.

DESCRIPTION

The following description is presented to enable any person skilled in the art to make and use the invention, and is provided in the context of a particular application and its requirements. Various modifications to the preferred embodiment will be readily apparent to those skilled in the art, and the general principles defined herein may be applied to other embodiments and applications without departing from the spirit and scope of the invention. Thus, the present invention is not intended to be limited to the embodiment shown but is to be accorded the widest scope consistent with the principles and features disclosed herein.

Figure 1:
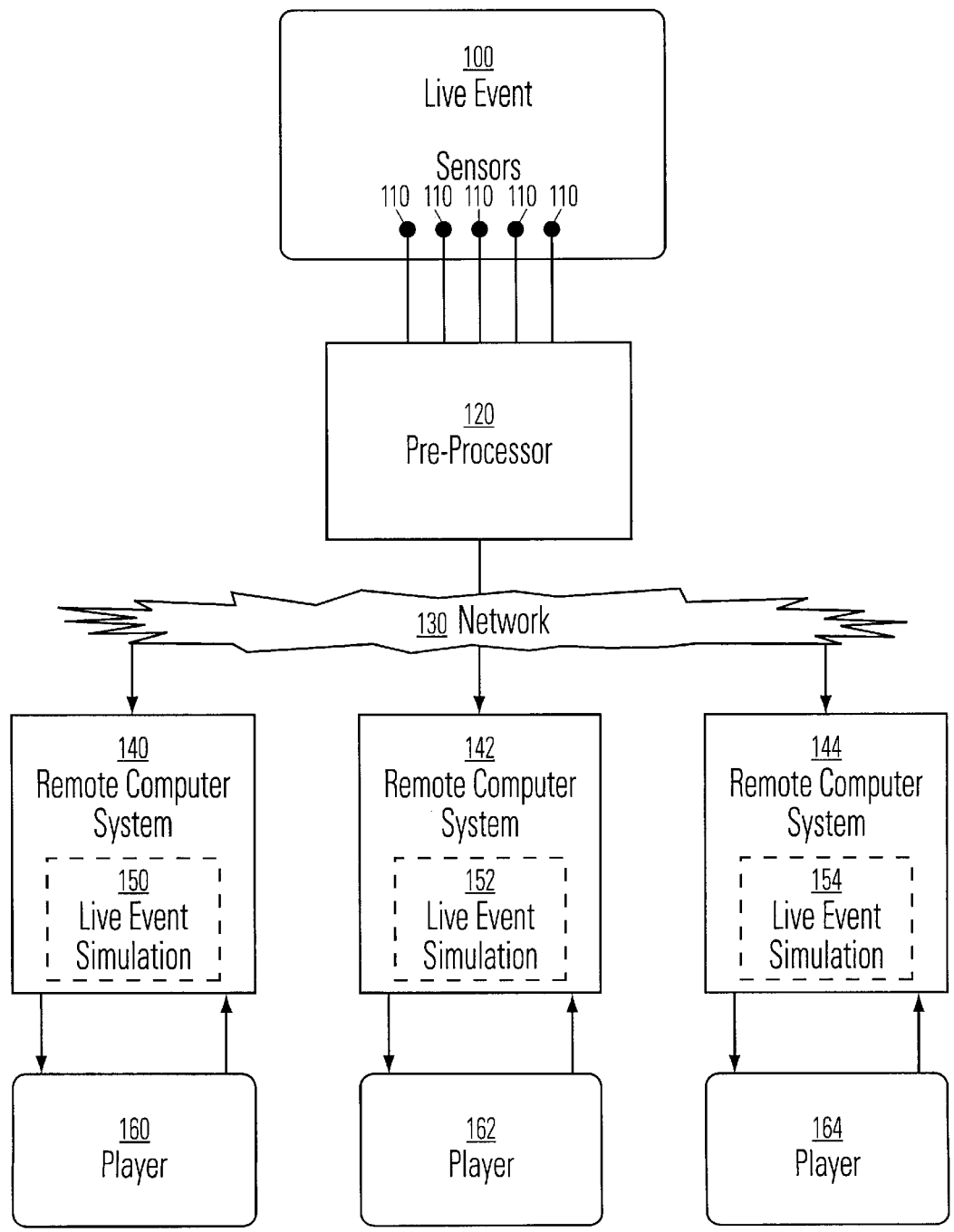
FIG. 1 is diagram illustrating the structure of the method and apparatus for simulating participation with a live event in accordance with an aspect of the present invention.

FIG. 1 is a functional block diagram of the major functional components in a system for simulating participation with a live event according to one embodiment of the present invention. A collection of sensors 110 at various locations in a live event 100 gather data to be used in remote simulations of live event 100. These sensors 110 connect to preprocessor 120, which assembles the data collected from sensors 110 in preparation for transmission across network 130. Network 130 connects preprocessor 120 to a collection of remote computer systems 140, 142 and 144. These remote computer systems 140, 142 and 144, contain separate live event simulations 150, 152, and 154, respectively. Game players 160, 162, and 164, sitting at computers 140, 142, and 144, interact with live event simulations 150, 152, and 154. In particular, player 160 interacts with live event simulation 150 on remote computer system 140. Player 162 interacts with live event simulation 152 on remote computer system 142. And, player 164 interacts with live event simulation 154 on remote computer system 144.

Live event 100 can be any type of competitive or participatory event in which remote participants would be interested in participating in. This includes, but is not limited to, automobile racing, sailboat racing, motorcycle racing, skiing, bobsledding and even aerial combat. Other types of participatory activities such as gambling, lotteries and board games also qualify as live events.

Figure 2:
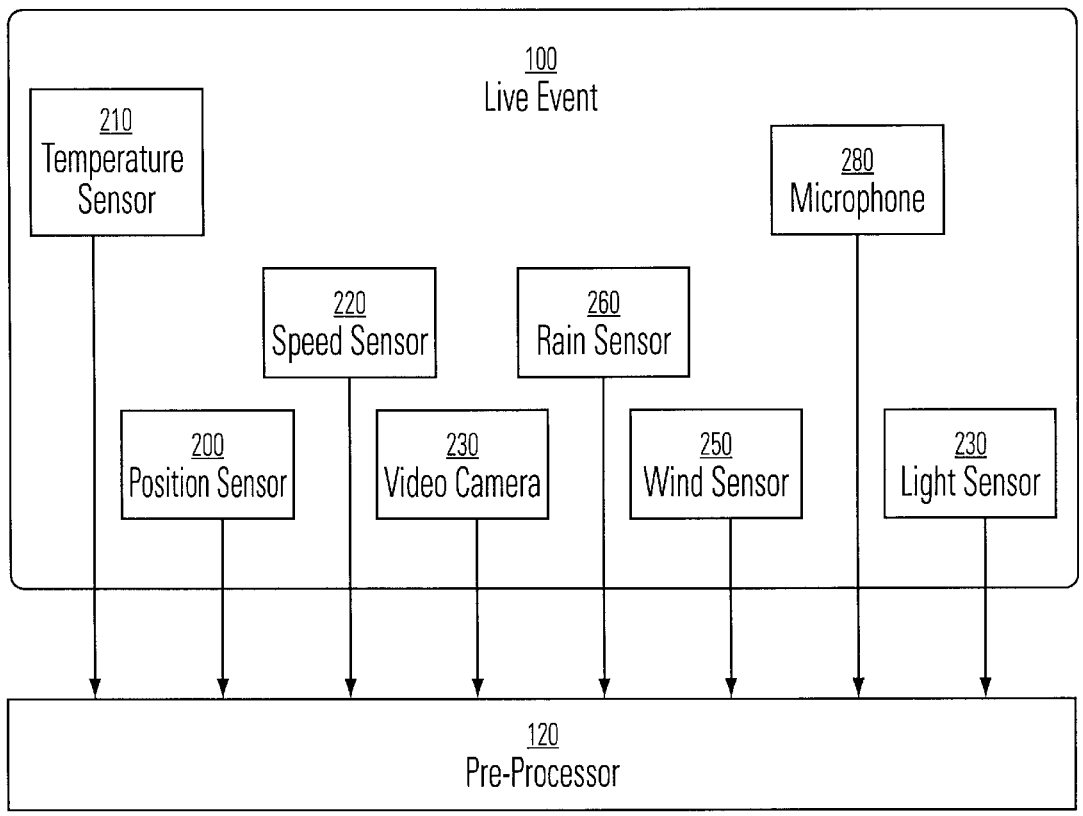
FIG. 2 is a block diagram illustrating a number of possible sensors located at the live event for collection of data which is used to construct the simulation of the live event in accordance with an aspect of the present invention.

FIG. 2 illustrates a variety of sensors 110 located within live event 100. Position sensor 200 detects the position of a vehicle or a participant in live event 100. In one embodiment of the present invention, position sensor 200 takes the form of a global positioning system (GPS) location sensor. Speed sensor 220 monitors the speed of various participants in live event 100. Speed sensor 220 may take the form of an internal monitor (on the speedometer of a vehicle, for example) or an external speed measurement system (radar, for example).

Other sensors monitor atmospheric conditions. For example, a temperature sensor 210, such as a thermometer, keeps track of how hot or how cold a road surface is. A wind sensor 250 keeps track of wind conditions, for example, to determine a sailboat's performance in a simulation of a sailing event. A rain sensor 260 determines race course characteristics such as road slickness.

Other types of sensors collect sensory data. A light sensor 230 measures intensity of ambient lighting at live event 100 to determine, for example, whether the live event 100 is taking place at night, so that the display of live event 100 can be modified to reflect nighttime conditions.

A video camera 230 gathers video images from different locations within live event 100. In one embodiment of the present invention, a video camera 230 is mounted above the live event in a blimp to provide a bird's eye view of live event 100. In another embodiment, multiple video cameras are located at various strategic positions within live event 100. In yet another embodiment, participants in live event 100 wear helmet cameras which provide participant perspectives on live event 100.

A microphone 280 monitors sound from live event 100. This sound can be added to live event simulation 150 to enhance the reality of live event simulation 150. For example, a large collection of microphones 280 located at strategic positions within live event 100 create a sound mapping of live event 100. This sound mapping is used to accurately reproduce sounds at different locations as a simulated participant navigates within live event 100.

Finally, sensors 200, 210, 220, 230, 240, 250, 260, 270, and 280 all connect to preprocessor 120.

Referring again to FIG. 1, preprocessor 120 performs a number of operations on the data gathered through sensors 110, including, for example: extraction of position information from a video signal through image recognition software, and compression of data collected through sensors 10 in preparation for transport across network 130 to remote computer systems 140, 142 and 144. In another embodiment, preprocessor 120 contains very little computing power, and merely provides simple data routing elements which transmit raw data from sensors 110 to computers 140, 142 and 144. In yet another embodiment, preprocessor 120 provides sophisticated compression and filtering functions, requiring special purpose hardware for digital signal processing, as well as a central processing unit connected to a full computational system. Preprocessor 120 also buffers data from sensors 110. This allows data collected from sensors 110 to be assembled and temporarily stored before transmission across network 130. According to one embodiment of the present invention, preprocessor 120 includes dedicated hardware to convert analog signals from sensors 110 into digital form for transport over network 130.

Network 130 transports data from preprocessor 120 to computers 140, 142 and 144. In one embodiment, network 130 comprises a computer network, such as the Internet, used to transmit a stream of data from preprocessor 120 to remote computer systems 140, 142 and 144. In one embodiment, this stream of data includes a digitized video signal. In another embodiment, network 130 is a wireless computer network. In yet another embodiment, network 130 is a broadcast television network, which transmits a video signal and other data from preprocessor 120 to remote computer systems 140, 142 and 144. According to another embodiment, network 130 is a dedicated cable television network. In yet another embodiment, network 130 is a collection of telephone lines.

Figure 3:
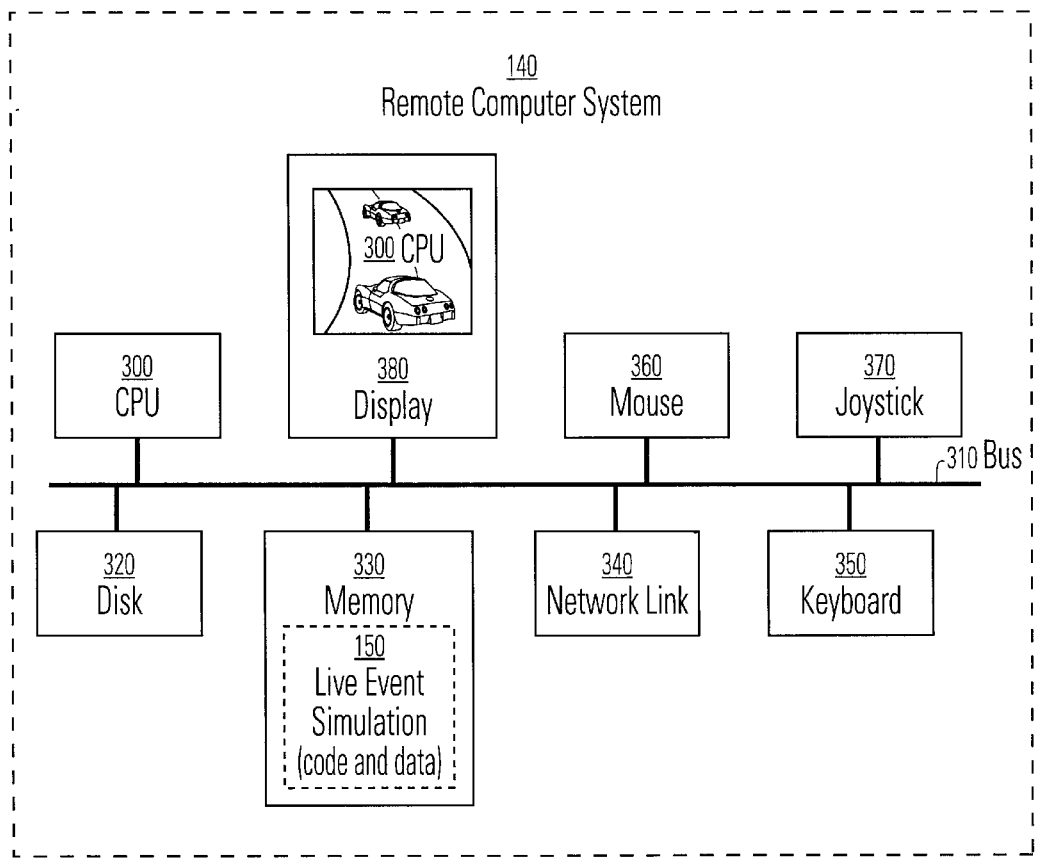
FIG. 3 is a block diagram illustrating the structure of the computer system in which the live event simulation takes place in accordance with an aspect of the present invention.

FIG. 3 is a block diagram illustrating the structure of a remote computer system 140, which contains live event simulation 150. Remote computer system 140 comprises a central processing unit (CPU) 300 connected to bus 310. Bus 310 connects CPU 300 to disk drive 320, display 380 and memory 330. Memory 330 contains executable computer code and data 340 for live event simulation 150. Bus 310 also connects CPU 300 to a number of data input devices including, but not limited to: mouse 360, joystick 370, and keyboard 350. Other input devices may be connected to remote computer system 140. For example, a microphone with voice recognition software or even a video camera with image recognition software. Finally, network interface 340 connects remote computer system 140 to network 130 (from FIG. 3). Network interface 340 may take the form of an Ethernet transceiver, a television broadcast receiver or any other interface compatible with network 130.

Figure 4:
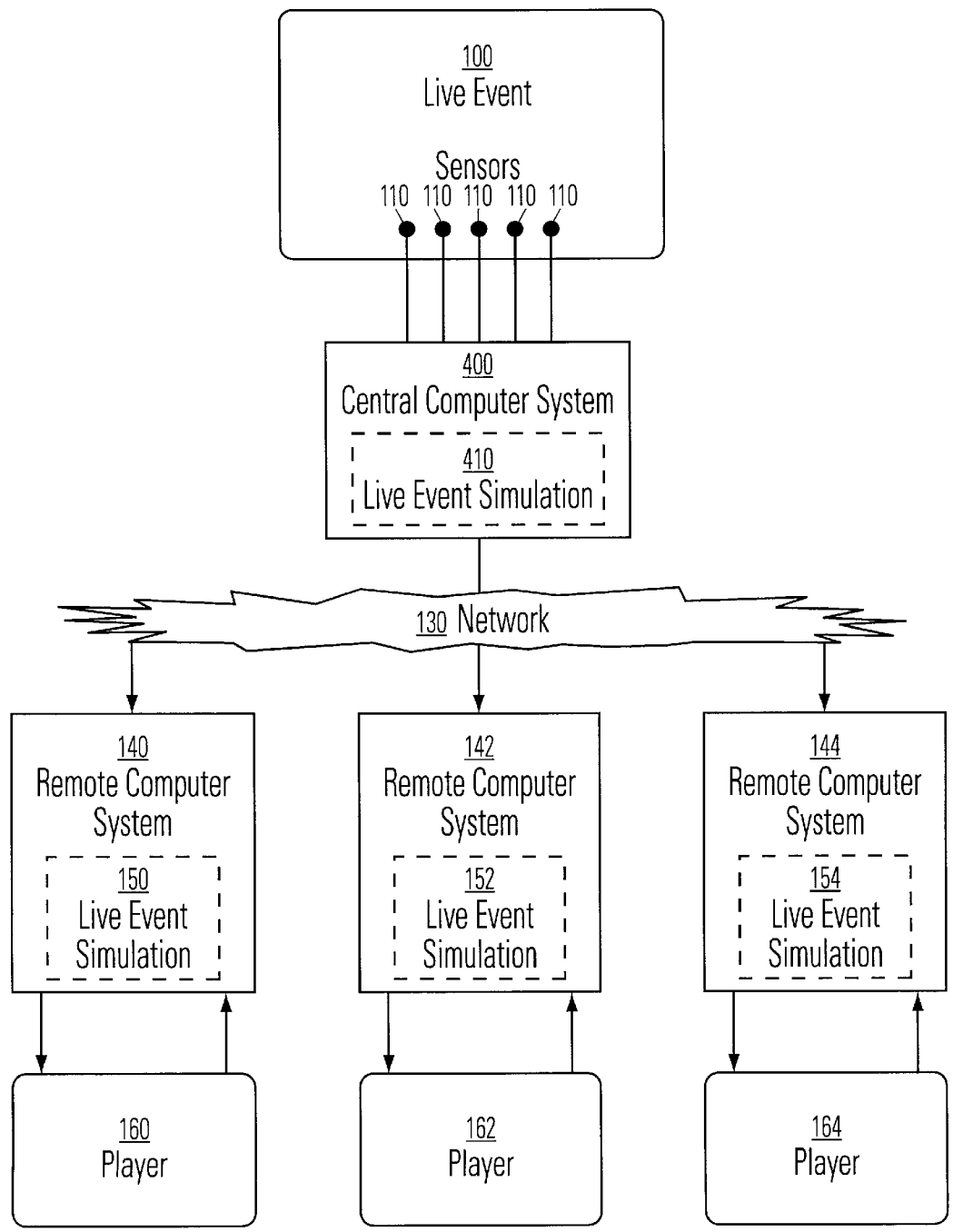
FIG. 4 is a diagram illustrating an alternative structure for the method and apparatus for simulating participation with a live event in accordance with an aspect of the present invention.

FIG. 4 is a functional block diagram of a system for simulating participation in a live event according to another embodiment of the present invention. This embodiment is the same as the embodiment illustrated in FIG. 1, except for the fact that preprocessor 120 in FIG. 1 has been replaced with a central computer system 400 in FIG. 4. This embodiment differs from the embodiment shown in FIG. 1 where the live event simulation takes place completely at remote computer systems 140, 142 and 144. In the embodiment shown in FIG. 4, central computer system 400 takes input from sensors 110 and uses this input to create a centralized live event simulation 410. Live event simulation 410 takes user input from players 160, 162 and 164 located at remote computer systems 140, 142 and 144, and uses this input, along with input from sensors 110, to determine the course of live event simulation 410. Bidirectional communication takes place across network 130 between central computer system 400 and remote computer systems 140, 142 and 144.

In one embodiment, at least part of the live event simulation takes place at central computer system 400, and other parts of the live event simulation 150, 152, and 154, take place in remote computer systems 140, 142 and 144. In another embodiment, the entire live event simulation 410 takes place at central computer system 400, and remote computer systems 140, 142 and 144 merely function as display and data input devices, such as computer terminals. According to another embodiment of the present invention, the live event simulation is divided into multiple pieces and these pieces are executed across a number of nodes of a distributed computing system.

Figure 5:
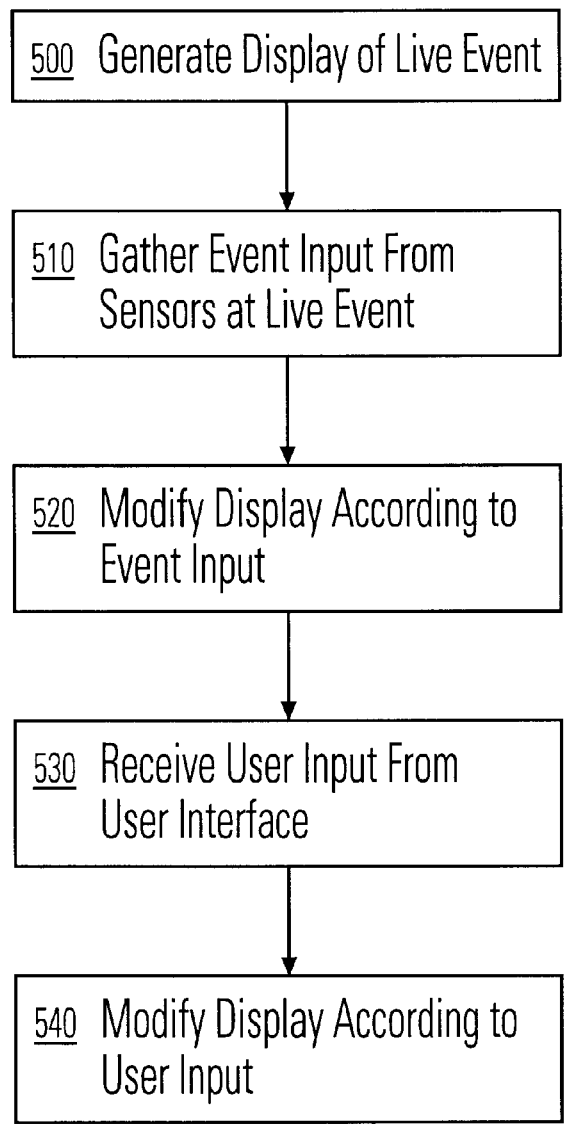
FIG. 5 is a flowchart illustrating the sequence of steps which the system embodied in FIG. 1 goes through in order to provide a simulation of a live event in accordance with an aspect of the present invention.

FIG. 5 is a flowchart illustrating how live event simulation 150 operates according to one embodiment of the present invention. At step 500, computer system 140 (illustrated in FIG. 3) generates a display 380 of live event 100, which is viewed by player 160. At step 5 10, live event simulation 150 gathers "event" input from live event 100 through sensors 110. At step 520, this event input is used to modify display 380 to properly reflect the current state of live event 100. At step 530, computer system 140 receives "user" input from player 160. At step 540, this user input is used to update display 380 to reflect the effect of user commands on live event simulation 150.

FIG. 5 illustrates one possible ordering of steps 500, 510, 520, 530 and 540. Many alternative orderings of these steps are possible. The only requirement is that display 380 of computer system 140 be periodically updated to reflect the evolution of live event 100, and the effect of commands received from player 160.

According to one embodiment of the present invention, display 3 80 of live event 100 contains entities corresponding to both simulated participants and real participants in live event 100. Rules encoded in live event simulation 150 govern how these simulated and real entities interact with each other in live event simulation 150. For example, according to one embodiment of the present invention, a rule specifies that a simulated entity cannot occupy the same physical space as a real entity. If a player attempts to move a simulated entity into the same physical space as a real entity, the simulated entity will move a close as possible to the real entity, but will be prevented from occupying the same physical space as the real entity in live event simulation 150.

According to one embodiment of the present invention, two types of interactions are regulated by live event simulation 150: (1) interactions between simulated participants; and (2) interactions between real participants and simulated participants. A game designer has great flexibility is specifying rules governing interactions between simulated participants, because live event simulation 150 has complete control over the actions and reactions of simulated participants. However, a game designer has less flexibility in specifying rules governing interactions between real participants and simulated participants, because live event 100 proceeds completely independently of the simulated participants. Consequently, real participants from live event 100 cannot "react" to actions of the simulated participants without deviating the from live event 100. Nevertheless, limited forms of interaction between simulated and real participants can be imbedded in live event simulation 150. For example, in a simulation of an automobile race, a simulated vehicle may be obliged to give way to let a real vehicle pass, and collisions between simulated vehicles may not be allowed to affect real vehicles.

One embodiment of the present invention provides facilities for a game designer to develop a customized set of rules to govern interactions between participants in live event simulation 150.

In one embodiment of the present invention, simulated participants are forced to assume the position of the closest real participant in live event 100 in order to avoid excessive congestion. For example, in automobile racing, a simulated vehicle is forced to assume the position of the closest real vehicle. The simulated vehicle then engages in "microtactics" in the neighborhood of the closest real vehicle. If the position of the simulated vehicle deviates significantly from the closest real vehicle, the simulated vehicle "breaks away" from the real vehicle, and assumes its own independent position.

Live event simulation 150 is synchronized with live event 100 so that display 380 of live event simulation 150 appears to be substantially simultaneous with live event 100 to a player 160 of live event simulation 150. Synchronization between live event 100 and live event simulations 150, 152 and 154 at remote computer systems 140, 142 and 144, is accomplished in a number of ways. In one embodiment of the present invention, a television signal transmits information between live event 100 and computers 140, 142 and 144, and synchronization information is encoded in the television signal by modulation or by transmitting it during the vertical blanking interval (VBI) of the television signal. If network 130 is a computer network, periodic transmissions over the computer network 130 are used to synchronize live event simulation 150 with live event 100. In one embodiment, the process of synchronization is simplified by delaying the broadcast of live event 100 to allow time for processing of data collected from the live event 100 and for transmission over network 130 to remote computer systems 140, 142 and 144. In yet another embodiment, live event simulation 150 is synchronized with a recorded playback of live event 100.

According to one embodiment of the present invention, synchronization between live event 100 and live event simulation 150 is maintained by interpolation. Periodic transmissions from live event 100 are used to update live event simulation 150. Between these periodic transmissions, the live event simulation 150 interpolates the position of real and simulated participants according to a set of rules, (for example, the laws of motion), until another periodic transmission is received from live event 100. When received, the periodic transmission from live event 100 is used to correct any divergence of live event simulation 150 from live event 100.

In one embodiment of the present invention, computer-generated images of simulated participants are mixed with a live video feed from live event 100. This is accomplished by digitizing the video feed and overwriting it with computer-generated images of the simulated participants. In another embodiment, it is accomplished by selectively mixing the analog video signal from live event 100 and a computer-generated analog signal. In order to achieve a realistic appearance, live event simulation 150 uses appropriate lighting and shading models to generate images of simulated participants in live event 100.

One embodiment of the present invention supports simulated participation with a playback of a recording of a live event 100. Information gathered from live event 100 through sensors 110 is recorded, and then later played back. Live event simulation 150 uses this recorded playback as if it were live input for purposes of creating a live event simulation 150 based on a recording of live event 100. This recorded playback feature makes it possible to simulate participation in a live event 100 which happened in the past. This allows a player 160 to practice many times against the same recorded live event 100, and to try out a number of strategies against the same recorded live event 100.

One embodiment of the present invention provides a facility to collect scoring information from live event simulations 150, 152 and 154. A return communication channel (for example, network 130) is used to gather scoring information from remote live event simulations 150, 152, and 154 at a central location (possibly preprocessor 120), where this scoring information tabulated. A global winner can thus be determined for all remote simulations.

Live Event Simulation Example

Figure 6:
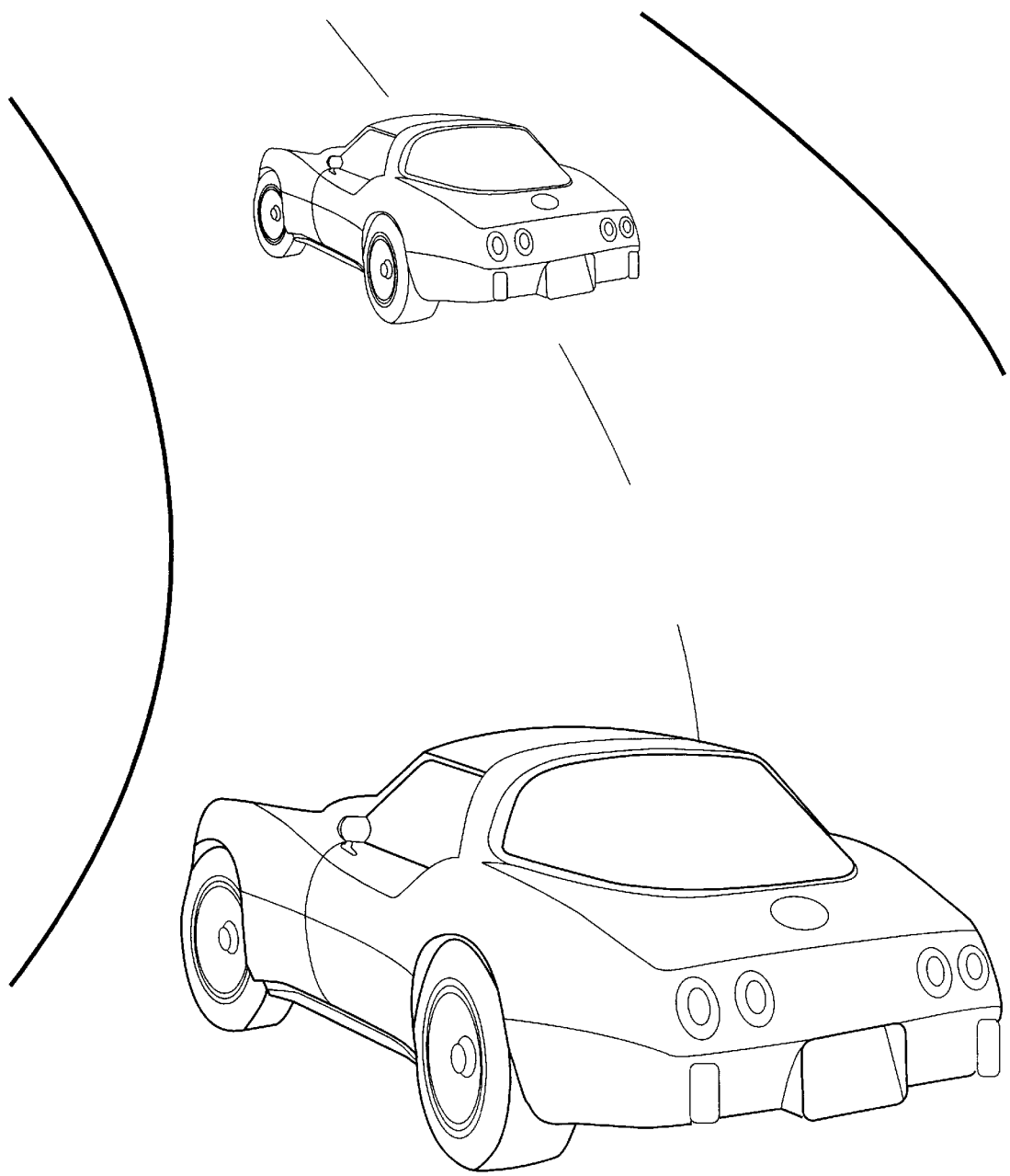
FIG. 6 provides a simplified example of the display of the simulation of a live event in the context of automobile racing in accordance with an aspect of the present invention.

FIG. 6 illustrates the display 380 for simulated participation in an automobile race according to one embodiment of the present invention. In this example, display 380 comprises a driver's view of the race from a simulated vehicle. See FIG. 6. Referring to FIG. 1, sensors 110 gather position information for vehicles in live event 100, which in this example is an automobile race. Radio transmitters in each race vehicle transmit position information to a receiver with directional antennae which determines the position of each vehicle in the race. This position information is collected in preprocessor 120 where it is organized into an ordered list, and compressed for transmission. Next, the compressed position information is transmitted over network 130 to remote computer system 140.

Remote computer system 140 uses the position information to construct a three-dimensional representation of the real vehicles in the race. A display 380 of the driver's view is constructed by taking a projection of this three dimensional model from the perspective of a driver located in a simulated vehicle. Only vehicles directly within the simulated driver's view are visible in display 380.

Display 380 is updated at video rates, which potentially creates a problem because the video display may have to be updated more frequently than position information is received from sensors 110. Live event simulation 150 interpolates the positions of real vehicles in the race between periodic updates. This involves predicting the position of real vehicles in display 380 on the basis of prior position information. First, the velocity of a real vehicle is determined by examining the vehicle's position during several of the preceding measurements. Next, this velocity is used to predict the path of a vehicle in future video frames. When new position information is finally received from sensors 110, this new position information is used to correct any divergence which may have occurred between the predicted position and actual position of the real vehicle.

User commands control the position of a simulated vehicle. Remote computer system 140 receives input from player 160 through joystick 370 connected to remote computer system 140. Joystick 370 transmits steering, acceleration and braking commands to remote computer system 140. Inside remote computer system 140, live event simulation 150 uses these commands to alter the path of the simulated vehicle in live event simulation 150. This may change the simulated driver's view, and hence change the display 380 of live event simulation 150. For example, if player 160 steers to the right, the display 380 will be updated so that it appears the simulated automobile has moved to the right; this means the scenery and other cars in display 380 will shift to the left.

Interactions between simulated vehicles and real vehicles or between simulated vehicles and other simulated vehicles are governed by rules. For example, a simulated vehicle must yield, and will automatically do so, when a real vehicle attempts to pass. A real vehicle will also yield when a simulated vehicle is attempting to pass. This is accomplished by altering the path of a real vehicle to allow a simulated vehicle to pass, and then moving the real vehicle back to its actual path.

The simulation also accounts for the slipstream of air behind real and simulated vehicles, which allows trailing vehicles to draft on vehicles ahead of them, saving fuel and increasing speed. Drafting is possible in a number of situations. Simulated vehicles may draft on the slipstreams which follow real vehicles. Simulated vehicles may draft on the slipstreams of other simulated vehicles. However, real vehicles are not influenced in any way by the slipstreams of simulated vehicles, otherwise the position of a real vehicle in live event simulation 150 might deviate significantly from its actual position in live event 100.

If a simulated vehicle gets too close to a real vehicle, the simulated vehicle assumes the position of the real vehicle. This avoids congestion problems due to simulated vehicles clogging up the spaces between real vehicles. Most commonly, simulated vehicles assume the position of real vehicles at the start of an automobile race, when real vehicles are stacked up in tight formation behind the starting line. Alternatively, a simulated vehicle may start at the end of the pack behind all of the real vehicles, in last position.

The simulation of the automobile race according to the present example allows for concurrent participation by multiple simulated vehicles operated by multiple players. A collection of players 160, 162 and 164, interacting with computers 140, 142 and 144, are joined into a group of simulated participants. These simulated participants interact with each other in the same simulation of live event 100, which takes place locally at computers 140, 142 and 144. As simulated vehicles change position, position information for the simulated vehicles is broadcast between computers 140, 142 and 144, allowing live event simulations 150, 152 and 154, to update the positions of other simulated vehicles.

According to another embodiment of the present invention, preprocessor 120 keeps track of the locations of the simulated players. For example, remote computer systems 140, 142 and 144, broadcast the position of simulated vehicles corresponding to players 160, 162 and 164 to preprocessor 120. Preprocessor 120 then broadcasts this position information to all of the other remote computer systems participating in the same simulation.

Access to a particular simulation, involving a group of simulated players, is restricted to a limited number of simulated players in order to avoid problems of overcrowding. If large numbers of players want to participate in the same event, they each send a "request to participate" to preprocessor 120. Preprocessor 120 then divides the remote participants into groups of limited size. Each group is associated with a separate simulation of live event 100, thereby avoiding overcrowding. Simulated race cars then interact with only simulated race vehicles from their group in addition to the real race vehicles. As additional remote users join a live event simulation, they will be combined into additional limited groups, members of which will only be able to interact with each other and the real race cars.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in the art.

What is claimed is:

1. In a computer system with a user interface, a method for simulating interaction with a live event comprising:

generating a display representing said live event in said computer system, wherein said display comprises a plurality of entities corresponding to real participants in said live event and at least one simulated entity, which correspond to at least one simulated participant in said live event, and positions of said plurality of entities corresponding to real participants are not controlled in response to said user inputs;

gathering event input from at least one sensor located at said live event;

modifying said display according to said event input;

receiving user input from said user interface; and modifying said display according to said user input.

2. The method of claim 1 including controlling a position in said display of said at least one simulated entity in response to said user inputs.

3. The method of claim 1 including modifying said plurality of entities according to one or more rules of engagement, which specify an interaction involving said at least one simulated entity and said at least one real entity.

4. The method of claim 3 wherein more than one simulated entity exists, and said rules of engagement specify how said simulated entities interact with each other.

5. The method of claim 3 wherein said at least one rule of engagement includes a rule requiring a simulated entity to assume the position of a real entity when said simulated entity is closer than a specified distance from said real entity.

6. The method of claim 3 including modifying said plurality of rules of engagement according to said user input.

7. The method of claim 1 further including periodically synchronizing said display with said live event, such that said event input gathered at a first time is reflected in said display at a second time, wherein a time interval between said first time and said second time is such that the display appears to be substantially simultaneous with said live event to a user of said computer system.

8. The method of claim 1 wherein said event input includes position information for at least one real participant in said live event.

9. The method of claim 1 wherein said computer system is located remotely from said live event, and said gathering event input further comprises:

transmitting said event input through a communication channel; and receiving said event input at said computer system.

10. The method of claim 9 wherein said communication channel comprises a computer network.

11. The method of claim 9 wherein said communication channel comprises broadcast television.

12. The method of claim 9 wherein said communication channel comprises a cable television network.

13. In a computer system with a user interface, a method for simulating interaction with a live event comprising:

generating a display representing said live event in said computer system, wherein said display comprises a plurality of entities corresponding to real participants in said live event and at least one simulated entity, which correspond to at least one simulated participant in said live event and positions of said plurality of entities corresponding to real participants are not controlled in response to said user inputs;

gathering event input from at least one sensor located at said live event, modifying said display according to said event input;

receiving user input from said user interface; and modifying said display according to said user input; and periodically synchronizing said display with a broadcast of said event input gathered from said live event, such that said event input, which is broadcast at a first time, is reflected in said display at a second time, wherein a time interval between said first time and said second time is such that the display appears to be substantially simultaneous with said broadcast of said event input to a user of said computer system.

14. In a computer system with a user interface, a method for simulating interaction with a live event comprising:

generating a display representing said live event in said computer system, wherein said display comprises a plurality of entities corresponding to real participants in said live event and at least one simulated entity, which correspond to at least one simulated participant in said live event and positions of said plurality of entities corresponding to real participants are not controlled in response to said user inputs;

gathering event input from at least one sensor located at said live event;

modifying said display according to said event input;

receiving user input from said user interface, modifying said display according to said user input;

periodically synchronizing said display with a playback of a recording of said event input gathered from said live event, such that said event input, which is played back from a recording at a first time, is reflected in said display at a second time, wherein a time interval between said first time and said second time is such that the display appears to be substantially simultaneous with said playback to a user of said computer system.

15. In a computer system with a user interface, a method for simulating interaction with a live event comprising:

generating a display representing said live event in said computer system, wherein said display comprises a plurality of entities corresponding to real participants in said live event and at least one simulated entity, which correspond to at least one simulated participant in said live event and positions of said plurality of entities corresponding to real participants are not controlled in response to said user inputs;

gathering event input from at least one sensor located at said live event;

modifying said display according to said event input;

receiving user input from said user interface, modifying said display according to said user input;

gathering scoring information from said computer system;

communicating said scoring information to a central data collection site; and receiving and assembling scoring information from at least one other computer system at said central data collection site.

16. In a computer system with a user interface, a method for simulating interaction with a live event comprising:

generating a display representing said live event in said computer system, wherein said display comprises a plurality of entities corresponding to real participants in said live event and at least one simulated entity, which correspond to at least one simulated participant in said live event and positions of said plurality of entities corresponding to real participants are not controlled in response to said user inputs;

gathering event input from at least one sensor located at said live event;

modifying said display according to said event input;

receiving user input from said user interface;

modifying said display according to said user input;

wherein said event input includes environmental conditions from said live event that effect performance of said plurality of participants in said live event.

17. The method of claim 16 wherein said environmental conditions include wind velocity.

18. The method of claim 16 wherein said environmental conditions include road slickness.

19. In a computer system with a user interface, a method for simulating participation in a live sporting event comprising:

generating a display representing said live sporting event in said computer system, wherein said display comprises a plurality of entities corresponding to participants in said live event, and wherein said plurality of entities includes at least one real entity which corresponds to at least one real participant in said live event, and a simulated entity, which corresponds to a simulated participant in said live event;

gathering position information about said at least one real entity in said live event from at least one sensor located at said live sporting event;

modifying a position of said at least one real entity in said display using said position information;

receiving a user command from said user interface; and modifying a position of said simulated entity in said display using said user command and according to at least one rule of engagement requiring a simulated entity to assume the position of a real entity when said simulated entity is closer than a specified distance from said real entity.

20. In a computer system with a user interface, a method for simulating participation in a live sporting event comprising:

generating a display representing said live sporting event in said computer system, wherein said display comprises a plurality of entities corresponding to participants in said live event, and wherein said plurality of entities includes at least one real entity, which corresponds to at least one real participant in said live event, and a simulated entity, which corresponds to a simulated participant in said live event;

gathering position information about said at least one real entity in said live event from at least one sensor located at said live sporting event;

modifying a position of said at least one real entity in said display using said position information;

receiving a user command from said user interface;

modifying a position of said simulated entity in said display using said user command; and periodically synchronizing said display with a broadcast of said event input gathered from said live event, such that said event input, which is broadcast at a first time, is reflected in said display at a second time, wherein a time interval between said first time and said second time is such that the display appears to be substantially simultaneous with said broadcast of said event input to a user of said computer system.

21. In a computer system with a user interface, a method for simulating participation in a live sporting event comprising:

generating a display representing said live sporting event in said computer system, wherein said display comprises a plurality of entities corresponding to participants in said live event, and wherein said plurality of entities includes at least one real entity, which corresponds to at least one real participant in said live event, and a simulated entity, which corresponds to a simulated participant in said live event;

gathering position information about said at least one real entity in said live event from at least one sensor located at said live sporting event;

modifying a position of said at least one real entity in said display using said position information;

receiving a user command from said user interface;

modifying a position of said simulated entity in said display using said user command; and periodically synchronizing said display with a playback of a recording of said event input gathered from said live event, such that said event input, which is played back from a recording at a first time, is reflected in said display at a second time, wherein a time interval between said first time and said second time is such that the display appears to be substantially simultaneous with said playback to a user of said computer system.

22. In a computer system with a user interface, a method for simulating participation in a live sporting event comprising:

generating a display representing said live sporting event in said computer system, wherein said display comprises a plurality of entities corresponding to participants in said live event, and wherein said plurality of entities includes at least one real entity, which corresponds to at least one real participant in said live event and a simulated entity, which corresponds to a simulated participant in said live event;

gathering position information about said at least one real entity in said live event from at least one sensor located at said live sporting event;

modifying a position of said at least one real entity in said display using said position information;

receiving a user command from said user interface;

modifying a position of said simulated entity in said display using said user command;

gathering scoring information from said computer system;

communicating this scoring information to a central data collection site; and receiving and assembling scoring information from at least one other computer system at said central data collection site.

23. In a computer system with a user interface, a method for simulating participation in a live sporting event comprising:

generating a display representing said live sporting event in said computer system, wherein said display comprises a plurality of entities corresponding to participants in said live event, and wherein said plurality of entities includes at least one real entity, which corresponds to at least one real participant in said live event, and a simulated entity, which corresponds to a simulated participant in said live event;

gathering position information about said at least one real entity in said live event from at least one sensor located at said live sporting event wherein said event input includes environmental conditions from said live event that effect performance of said plurality of participants in said live event;

modifying a position of said at least one real entity in said display using said position information;

receiving a user command from said user interface;

modifying a position of said simulated entity in said display using said user command.

24. The method of claim 23 wherein said environmental conditions include wind velocity.

25. The method of claim 23 wherein said environmental conditions include road slickness.

26. In a computer system with a user interface, a method for simulating participation in a live sporting event wherein said computer system is located remotely from said live event, comprising:

generating a display representing said live sporting event in said computer system, wherein said display comprises a plurality of entities corresponding to participants in said live event, and wherein said plurality of entities includes at least one real entity, which corresponds to at least one real participant in said live event, and a simulated entity, which corresponds to a simulated participant in said live event;

gathering position information about said at least one real entity in said live event from at least one sensor located at said live sporting event;

transmitting said position information through a communication channel to said computer system;

modifying a position of said at least one real entity in said display using said position information;

receiving a user command from said user interface;

modifying a position of said simulated entity in said display using said user command.

27. The method of claim 26 wherein said communication channel comprises a computer network.

28. The method of claim 26 wherein said communication channel comprises broadcast television.

29. The method of claim 26 wherein said communication channel comprises a cable television network.

30. An apparatus for simulating interaction with a live event comprising:

at least one sensor for gathering event input from said live event;

a computer system including a user interface, wherein said user interface includes a display;

a communication channel connecting said at least one sensor to said computer system for transferring said event input to said computer system;

wherein said computer system generates a display representing said live event, said display comprising a plurality of entities corresponding to real participants in said live event and at least one simulated entity, which correspond to at least one simulated participant in said live event;

wherein said computer system receives user input from said user interface;

wherein said computer system periodically modifies said display according to said user input and said event input; and wherein positions in said display of said plurality of entities corresponding to real participants are not controlled in response to said user inputs.

31. The apparatus of claim 30 where a position in said display of said at least one simulated entity is controlled in response to said user inputs.

32. The apparatus of claim 30 including wherein said plurality of entities is modified according one or more rules of engagement, which specify an interaction involving said at least one simulated entity and said at least one real entity.

33. The apparatus of claim 32 wherein more than one simulated entity exists, and said rules of engagement specify how said simulated entities interact with each other.

34. The apparatus of claim 32 wherein said at least one rule of engagement includes a rule requiring a simulated entity to assume the position of a real entity when said simulated entity is closer than a specified distance from said real entity.

35. The apparatus of claim 32 wherein said rules of engagement are modified according to said user input.

36. The apparatus of claim 30 wherein said display of said live event is initially generated from said event input gathered from said at least one sensor at said live event.

37. The apparatus of claim 30 wherein said display is periodically synchronized with said live event, such that said event input gathered at a first time is reflected in said display at a second time, wherein a time interval between said first time and said second time is such that the display appears to be substantially simultaneous with said live event to a user of said computer system.

38. An apparatus for simulating interaction with a live event comprising:

at least one sensor for gathering event input from said live event;

a computer system including a user interface, wherein said user interface includes a display;

a communication channel connecting said at least one sensor to said computer system for transferring said event input to said computer system;

wherein said computer system generates a display representing said live event, said display comprising a plurality of entities corresponding to real participants in said live event and at least one simulated entity, which correspond to at least one simulated participant in said live event;

wherein said computer system receives user input from said user interface;

wherein said computer system periodically modifies said display according to said user input and said event input; and wherein said display is periodically synchronized with a broadcast of said event input gathered from said live event, such that said event input, which is broadcast at a first time, is reflected in said display at a second time, wherein a time interval between said first time and said second time is such that the display appears to be substantially simultaneous with said broadcast of said event input to a user of said computer system.

39. An apparatus for simulating interaction with a live event comprising:

at least one sensor for gathering event input from said live event;

a computer system including a user interface wherein said user interface, includes a display;

a communication channel connecting said at least one sensor to said computer system for transferring said event input to said computer system;

wherein said computer system generates a display representing said live event, said display comprising a plurality of entities corresponding to real participants in said live event and at least one simulated entity, which correspond to at least one simulated participant in said live event;

wherein said computer system receives user input from said user interface;

wherein said computer system periodically modifies said display according to said user input and said event input; and wherein said display is periodically synchronized with a playback of a recording of said event input gathered from said live event, such that said event input, which is played back from a recording at a first time, is reflected in said display at a second time, wherein a time interval between said first time and said second time is such that the display appears to be substantially simultaneous with said playback to a user of said computer system.

40. An apparatus for simulating interaction with a live event comprising:

at least one sensor for gathering event input from said live event;

a computer system including a user interface, wherein said user interface includes a display;

a communication channel connecting said at least one sensor to said computer system for transferring said event input to said computer system;

wherein said computer system generates a display representing said live event, said display comprising a plurality of entities corresponding to real participants in said live event and at least one simulated entity, which correspond to at least one simulated participant in said live event;

wherein said computer system receives user input from said user interface;

wherein said computer system periodically modifies said display according to said user input and said event input; and including a central data collection site which gathers and assembles scoring information from said computer system and at least one other computer system.

41. An apparatus for simulating interaction with a live event comprising:

at least one sensor for gathering event input from said live event;

a computer system including a user interface, wherein said user interface includes a display;

a communication channel connecting said at least one sensor to said computer system for transferring said event input to said computer system;

wherein said computer system generates a display representing said live event, said display comprising a plurality of entities corresponding to real participants in said live event and at least one simulated entity, which correspond to at least one simulated participant in said live event;

wherein said computer system receives user input from said user interface;

wherein said computer system periodically modifies said display according to said user input and said event input; and wherein said event input includes position information for at least one real participant in said live event.

42. An apparatus for simulating interaction with a live event comprising:

at least one sensor for gathering event input from said live event:

a computer system including a user interface, wherein said user interface includes a display;

a communication channel connecting said at least one sensor to said computer system for transferring said event input to said computer system;

wherein said computer system generates a display representing said live event, said display comprising a plurality of entities corresponding to real participants in said live event and at least one simulated entity, which correspond to at least one simulated participant in said live event;

wherein said computer system receives user input from said user interface;

wherein said computer system periodically modifies said display according to said user input and said event input; and wherein said event input includes environmental conditions from said live event that effect performance of said plurality of participants in said live event.

43. The apparatus of claim 42 wherein said environmental conditions include wind velocity.

44. The apparatus of claim 42 wherein said environmental conditions include road slickness.

45. An apparatus for simulating interaction with a live event comprising:

at least one sensor for gathering event input from said live event;

a computer system including a user interface, wherein said user interface includes a display;

a communication channel connecting said at least one sensor to said computer system for transferring said event input to said computer system;

wherein said computer system generates a display representing said live event, said display comprising a plurality of entities corresponding to real participants in said live event and at least one simulated entity, which correspond to at least one simulated participant in said live event;

wherein said computer system receives user input from said user interface;

wherein said computer system periodically modifies said display according to said user input and said event input; and wherein said communication channel comprises a computer network.

46. An apparatus for simulating interaction with a live event comprising:

at least one sensor for gathering event input from said live event;

a computer system including a user interface, wherein said user interface includes a display;

a communication channel connecting said at least one sensor to said computer system for transferring said event input to said computer system;

wherein said computer system generates a display representing said live event, said display comprising a plurality of entities corresponding to real participants in said live event and at least one simulated entity, which correspond to at least one simulated participant in said live event;

wherein said computer system receives user input from said user interface;

wherein said computer system periodically modifies said display according to said user input and said event input; and wherein said communication channel comprises broadcast television.

47. An apparatus for simulating interaction with a live event comprising:

at least one sensor for gathering event input from said live event;

a computer system including a user interface, wherein said user interface includes a display;

a communication channel connecting said at least one sensor to said computer system for transferring said event input to said computer system;

wherein said computer system generates a display representing said live event, said display comprising a plurality of entities corresponding to real participants in said live event and at least one simulated entity, which correspond to at least one simulated participant in said live event;

wherein said computer system receives user input from said user interface;

wherein said computer system periodically modifies said display according to said user input and said event input: and wherein said communication channel comprises a cable television network.

* * * * *